(12) United States Patent
Gerstner et al.

(10) Patent No.: US 12,516,847 B2
(45) Date of Patent: Jan. 6, 2026

(54) HOLDING ELEMENT AND SYSTEM WITH A PLURALITY OF HOLDING ELEMENTS FOR AT LEAST ONE SOLAR ELEMENT

(71) Applicant: voestalpine Metal Forming GmbH, Krems an der Donau (AT)

(72) Inventors: Florian Gerstner, Aalen (DE); Marcus Wiemann, Melle (DE)

(73) Assignee: voestalpine Metal Forming GmbH, Krems an der Donau (AT)

( * ) Notice: Subject to any disclaimer, the term of this patent is extended or adjusted under 35 U.S.C. 154(b) by 113 days.

(21) Appl. No.: 18/249,019

(22) PCT Filed: Jan. 20, 2023

(86) PCT No.: PCT/AT2023/060014
§ 371 (c)(1),
(2) Date: Apr. 13, 2023

(87) PCT Pub. No.: WO2024/152067
PCT Pub. Date: Jul. 25, 2024

(65) Prior Publication Data
US 2025/0085027 A1 Mar. 13, 2025

(51) Int. Cl.
*H02S 30/10* (2014.01)
*F16B 5/00* (2006.01)
(Continued)

(52) U.S. Cl.
CPC ............ *F24S 25/15* (2018.05); *F16B 5/0084* (2013.01); *H02S 30/10* (2014.12); *F24S 2025/02* (2018.05); *F24S 2080/01* (2018.05)

(58) Field of Classification Search
CPC ................... H02S 20/00–32; H02S 30/00–20
(Continued)

(56) References Cited

U.S. PATENT DOCUMENTS 4,269,904 A * 5/1981 Ikeno ................. C25D 3/54
428/629
4,610,936 A * 9/1986 Isobe ................. C22C 18/04
428/659
(Continued)

FOREIGN PATENT DOCUMENTS

CN 113166831 A * 7/2021 ............... C21D 1/26
DE 202012103392 U1 9/2012
(Continued)

OTHER PUBLICATIONS

EP-3828479-A1 English (Year: 2021).*
(Continued)

*Primary Examiner* — Bach T Dinh

(57) ABSTRACT

A holding element made of a sheet metal for at least one solar element, more particularly a solar module and/or solar collector, with a base that forms a support surface for the holding element, with two supports for the solar element that protrude up from the base at different heights, and with connecting elements, which are provided on ends of the holding element is disclosed, which has at least one, more particularly hole-shaped, opening and at least one tab, which tab is shaped for being inserted into such an opening. In order to be able to easily install a highly rugged holding element, it is proposed for at least one opening and at least one tab to be respectively provided next to each other on each of the ends, wherein the sheet metal is a metallically coated, more particularly hot-dip coated, sheet steel.

31 Claims, 8 Drawing Sheets

(51) Int. Cl.
*F24S 25/15* (2018.01)
*F24S 25/00* (2018.01)
*F24S 80/00* (2018.01)

(58) Field of Classification Search
USPC .................................................. 136/243–265
See application file for complete search history.

(56) References Cited

U.S. PATENT DOCUMENTS

| | | | |
|---|---|---|---|
| 10,917,040 B2 | 2/2021 | Wares et al. | |
| 2011/0203639 A1* | 8/2011 | Elliott | F24S 25/15 136/246 |
| 2013/0340820 A1* | 12/2013 | Inoue | H01G 9/20 136/252 |
| 2014/0109953 A1 | 4/2014 | Aulich | |
| 2017/0029912 A1* | 2/2017 | De Carvalho | C22C 38/50 |
| 2022/0017984 A1* | 1/2022 | Inoue | C21D 6/008 |

FOREIGN PATENT DOCUMENTS

| | | | | |
|---|---|---|---|---|
| DE | 102017102827 B3 | | 6/2018 | |
| EP | 2644745 A2 | * | 10/2013 | ............. C09D 5/084 |
| EP | 3828479 A1 | * | 6/2021 | ............. F24S 25/16 |
| JP | 2004146124 A | * | 5/2004 | |
| JP | 2011249849 A | | 12/2011 | |
| WO | 2004063485 A2 | | 7/2004 | |
| WO | 2013009894 A1 | | 1/2013 | |
| WO | WO-2013186217 A2 | * | 12/2013 | ............. F24J 5/5235 |

OTHER PUBLICATIONS

WO-2013186217-A2 English (Year: 2013).*
JP-2004146124-A English (Year: 2004).*
Arcelormittal, "E35—Steels with Magnelis Magnelis zinc-aluminium-magnesium coating", Jan. 18, 2022, URL: https://web.archive.org/web/20220118063856if_/https://conduct.nl/app/uploads/2021/10/Magnelis-datasheet.pdf; XP093070139, 15 pages.
International Search Report & Written Opinion for PCT Application No. PCT/AT2023/060014; mailed Aug. 14, 2023; 16 pages.

* cited by examiner

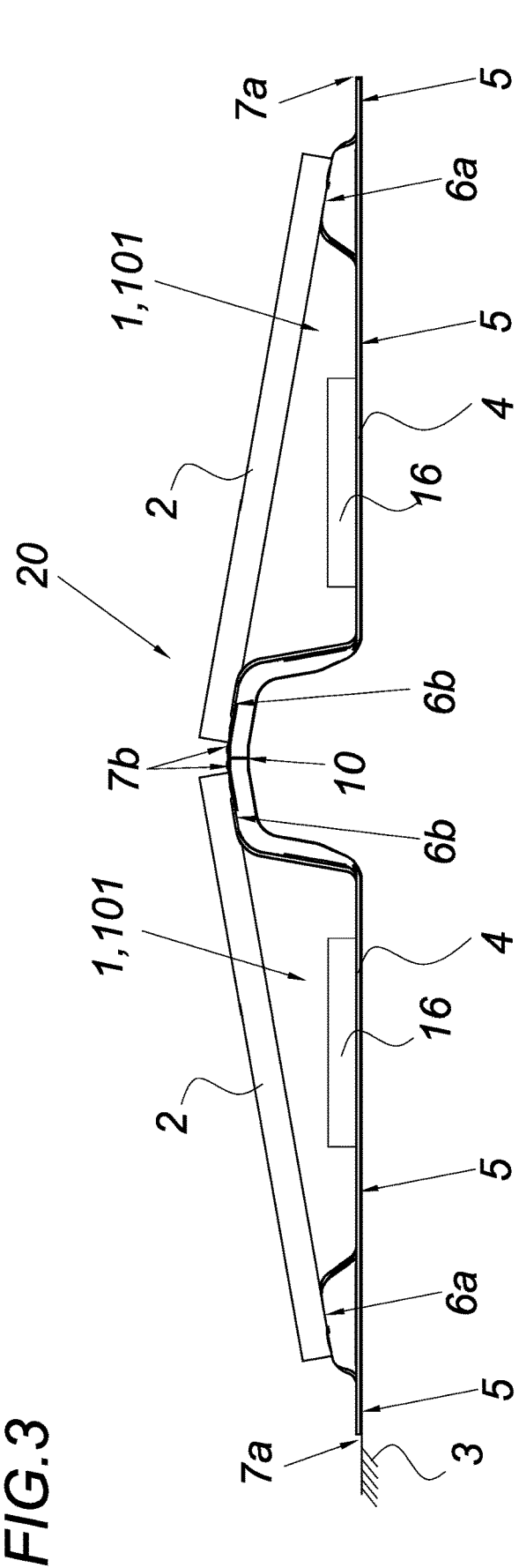
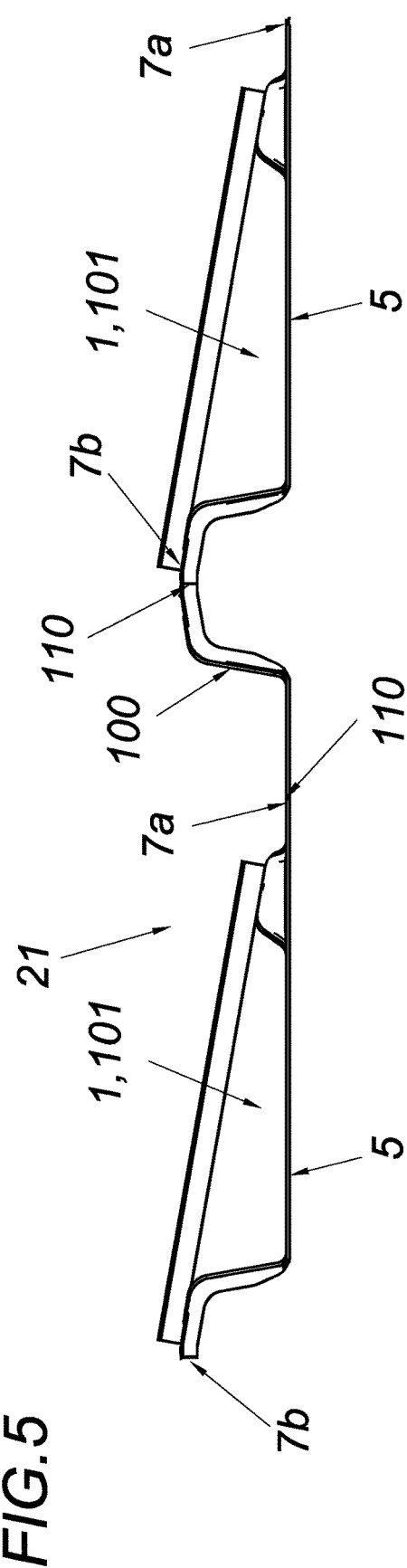
FIG.3
FIG.5

HOLDING ELEMENT AND SYSTEM WITH A PLURALITY OF HOLDING ELEMENTS FOR AT LEAST ONE SOLAR ELEMENT

FIELD OF THE INVENTION

The invention relates to a holding element and a system with a plurality of holding elements for at least one solar element, more particularly a solar module and/or solar collector, with a base that forms a support surface for the holding element, with two supports for the solar element that protrude up from the base at different heights, and with connecting elements, which are provided on ends of the holding element and have at least one opening and at least one tab, which tab is shaped for being inserted into such an opening.

DESCRIPTION OF THE PRIOR ART

To enable solar arrays to withstand wind loads, it is known from DE 202012 103392U1 to connect individual holding elements of the solar arrays to one another. For this purpose, each holding element has tabs at one end and oblong hole-shaped openings at another end, wherein the tabs at one end of the holding element are embodied to engage in openings in another holding element adjacent thereto, which produces a form-fitting longitudinal interconnection of the holding elements.

The holding elements hold solar elements at a predetermined inclination angle relative to a support surface. For this purpose, the holding elements each have two supports, which protrude up from the base at different heights and on which the solar elements rest.

Despite this interconnection, other measures are required in order to anchor the holding elements—for example in order to avoid unwanted shifting because among other things, this puts the solar elements at risk, which can be exacerbated for example by a lateral play between the opening and the tab, but also due to thermal expansion.

SUMMARY OF THE INVENTION

The stated object of the invention, therefore, is to modify the design of a holding element from the prior art explained at the beginning in such a way that it is able to hold solar elements in a secure way.

If at least one opening and at least one tab are provided next to each other on the respective ends, then this can among other things mechanically strengthen the connection between two holding elements by means of connecting elements that function in different ways. In addition, providing two different connecting elements next to each other can also improve the lateral precision of the connection, which ensures an exact alignment of the holding elements—this can be achieved even in the presence of wind loads and/or thermal loads acting on the holding elements. The holding element according to the invention is therefore able to hold solar elements in a rugged way.

In addition, this embodiment of the holding element according to the invention can permit it to be produced as a deep-drawn sheet metal part with optimized usage of material, thus making it possible to significantly reduce material and production costs.

This is more particularly the case in that the sheet metal is a metallically coated, more particularly hot-dip coated, sheet steel. This metallic coating of the sheet metal can more particularly be achieved by means of a hot-dip galvanization.

In general, it should be noted that the opening can be embodied as a cut-out hole and can thus be embodied in the shape of a hole, for example also an oblong hole. It is also conceivable for the opening and/or the tab to be formed out of sheet metal.

Preferably, the holding element can have at least one contact tongue on at least one outer edge of the end for a lightning protection and/or grounding equalization and/or potential equalization. It is thus possible to achieve a comparatively easily accessible and rugged option for integration into the lightning protection, for example of a building. This can also be provided, for example, for a grounding equalization and/or potential equalization. This equalization can, for example, be performed using a different holding element, an adapter element, a grounding strip, a terminal, etc. This can ensure a comparatively good current dissipation in the event of a lightning strike, even without the use of contact terminals that are known from the prior art.

For example, the holding element has at least one contact tongue at both outer edges of each end. The holding element can therefore be used for a wide variety of systems.

In this connection, it can be advantageous if on one end, one of the two contact tongues has a chamfer at its free end. This can facilitate the production of a contact with another contact tongue.

For example, the contact tongue protrudes beyond the tab on the relevant end, which can make it possible to provide a sufficiently large contact surface.

For better manageability, it can also be advantageous if the contact tongue extends essentially in a plane.

For a sufficient conducting of electrical energy for a lightning protection, it can be advantageous, for example, if the cross-sectional area of the contact tongue is greater than or equal to 12.5 mm$^2$. For example, the cross-sectional area of the contact tongue is greater than or equal to 20 mm$^2$. It is thus possible to enable, for example, a lightning protection in accordance with DIN EN 62561-1.

Preferably, the sheet steel has a steel alloy containing the following, each expressed in wt %:
- 0.02 to 0.25, more particularly 0.03 to 0.10, manganese (Mn),
- 0.01 to 0.10, more particularly 0.02 to 0.05, aluminum (Al),
- 0.003 to 0.10, more particularly 0.005 to 0.08, silicon (Si),
- 0.0010 to 0.0060, more particularly 0.0020 to 0.0045, carbon (C),
- members of the following group individually or in combination:
- 0.01 to 0.20, more particularly 0.02 to 0.10, niobium (Nb)
- 0.01 to 0.20, more particularly 0.02 to 0.10, titanium (Ti),
- and the remainder comprised of iron (Fe) and inevitable production-related impurities.

This steel alloy can also optionally contain members of the following group individually or in combination:
- <0.2, more particularly <0.10, molybdenum (Mo)
- <0.20, more particularly <0.10, copper (Cu)
- <0.05, more particularly <0.10, nitrogen (N)
- <0.02 phosphorus (P)
- <0.03 sulfur(S).

For example, the sheet steel is type DX54D according to VDA 239-100.

For example, the deep-drawing capacity of the sheet steel for producing the holding element can be improved if the sheet steel has a ferritic structure. It is thus possible to achieve a particularly inexpensive and rugged holding element.

This is more particularly the case if the ferritic content in the structure is >95%. For example, the ferritic content in the structure is >99%. The remainder of the structure can be composed of precipitates such as niobium nitrides and/or titanium nitrides.

For example, a comparatively high degree of corrosion protection can be achieved if the metallic coating is zinc-based or aluminum-based. More particularly, this metallic coating can be a ZM310 coating. An AZ185 coating can also be advantageous.

Preferably, the metallic coating has a layer application of at least 100 g/m². The ruggedness of the holding element can be further improved if this layer application is greater than 300 g/m².

The corrosion protection can be further enhanced if the zinc-based metallic coating also contains 1 to 5 wt % of aluminum and/or magnesium.

If the ends each have a first half-side and a second half-side, with at least one opening positioned in the first half-side and at least one tab positioned on the second half-side, then it is possible to further improve the stable positioning of the holding elements relative to each other. It is thus possible to further enhance the functional reliability of the holding element.

Preferably, on the end, for each opening of the one half-side, a tab of the other half-side is positioned at the same normal distance from the longitudinal centerline of the holding element in order to thus interconnect two holding elements according to the invention, which are oriented in diametrical opposition to each other, by means of their same respective ends. It is thus also easily possible, for example, to orient the holding elements so that they are aligned with each other. This feature can, among other things, further enhance the torsional rigidity of the interconnection of holding elements and thus further enhance the functional reliability.

In the direction of the tab bridge-piece, the tab preferably has a bent tab beginning and a tab end that is bent in the opposite direction from the tab beginning; the opening is provided in a raised area in the holding element, which raised area constitutes a socket that is accessible via the opening for a tab end so that the latter is able to hook into the socket. Thanks to this design of the tab and opening, as cooperating parts of connecting elements, they can accomplish the effect of absorbing longitudinal thermal expansion at the connection without strain. The form-fitting engagement and possibly also a frictional engagement at the connection is thus assured, which means that the ruggedness can be further enhanced according to the invention.

The tab end can have at least one, preferably two, laterally protruding lobes in order to improve the mechanical connection.

The design configuration of the holding element can be further simplified if the openings are embodied as slot-shaped, more particularly extending transversely to the longitudinal centerline of the holding element.

Preferably, the openings and tabs on an end are provided next to each other in alternation on an end. It is thus possible, among other things, to exert a compensating influence on tolerances of the individual connecting elements—which can further improve the positional accuracy of connected holding elements and/or their alignment relative to one another.

A sufficient support of the solar element that is to be supported can be provided if the first and second supports are each provided in the vicinity of an end of the holding element.

Compact dimensions are achievable if the holding element terminates at the second support and this second support is taller than the first support vertically. This design can also improve the stackability of the holding element, thus also allowing it to be more easily transported.

The latter can be further improved if in the longitudinal direction of the holding element, the base forms support surfaces both in front of the first support and between the first and second supports.

Preferably, between the first and second supports, the base is embodied to provide ballast for the holding element in order to thus secure the holding elements against wind forces.

If the base has a plurality of longitudinal beads, preferably protruding ones, then this can further enhance, for example, the torsional rigidity of the holding element.

The ease of use of the holding element when mounting solar elements can be improved if the first and/or second support has a positioning aid for the solar element and/or a cable-fixing element.

The holding element is particularly suitable for a simple and ruggedly embodied system with a plurality of holding elements, wherein at least two holding elements are connected to each other by means of the connecting elements of the same ends. This system of holding elements is particularly suitable, for example, for an east-west orientation of solar modules.

For a grounding equalization and/or potential equalization and/or also for a lightning protection, the holding elements can overlap with their contact tongues and form a contact surface situated between them. For example, this contact surface is flat. The two holding elements on these ends can thus provide a sufficiently large contact surface, for example. This ensures a safe electrical dissipation among other things in the event of a lightning strike.

In addition, a system composed of a plurality of holding elements according to the invention positioned in series can prove to be advantageous when it has at least two holding elements that are connected to each other by means of an adapter element, wherein on its ends, the adapter element has connecting elements, which are embodied to be complementary to those of the ends of the two holding elements. It is thus possible to achieve all of the previously mentioned advantages. The system of holding elements with an adapter element between said holding elements is advantageous with a south-facing orientation of solar modules.

For a grounding equalization and/or potential equalization and/or also for a lightning protection, with their contact tongues, the holding elements can each overlap a tongue of the adapter element and form a contact surface situated between them. For example, this contact surface is flat. This ensures a safe electrical dissipation among other things in the event of a lightning strike.

Preferably, this system has at least two holding elements and at least one solar element, more particularly a solar module and/or solar collector. The solar element rests on the supports of the two holding elements that are provided directly next to each other. The holding elements can be provided spaced apart from each other directly next to each other.

Preferably, the holding elements that are provided next to each other are electrically connected by means of an electrical conductor. For example, this can be a rigid conductor;

it is also conceivable to use a flexible conductor. As a result, the two holding elements are electrically connected to each other and it is therefore possible to provide a connection that is able to conduct lightning current in accordance with DIN EN 62561-1.

The holding element is more particularly suitable for a solar array if a solar element, more particularly a solar module and/or solar collector, rests on the supports of the holding element.

BRIEF DESCRIPTION OF THE DRAWINGS

By way of example, the subject matter of the invention is shown in greater detail in the figures based on several embodiment variants. In the drawings:

FIG. 3 shows a system composed of two holding elements and solar elements, FIG. 5 shows another system composed of two holding elements, an adapter element, and solar elements.

DETAILED DESCRIPTION OF THE PREFERRED EMBODIMENTS

Figure 1:
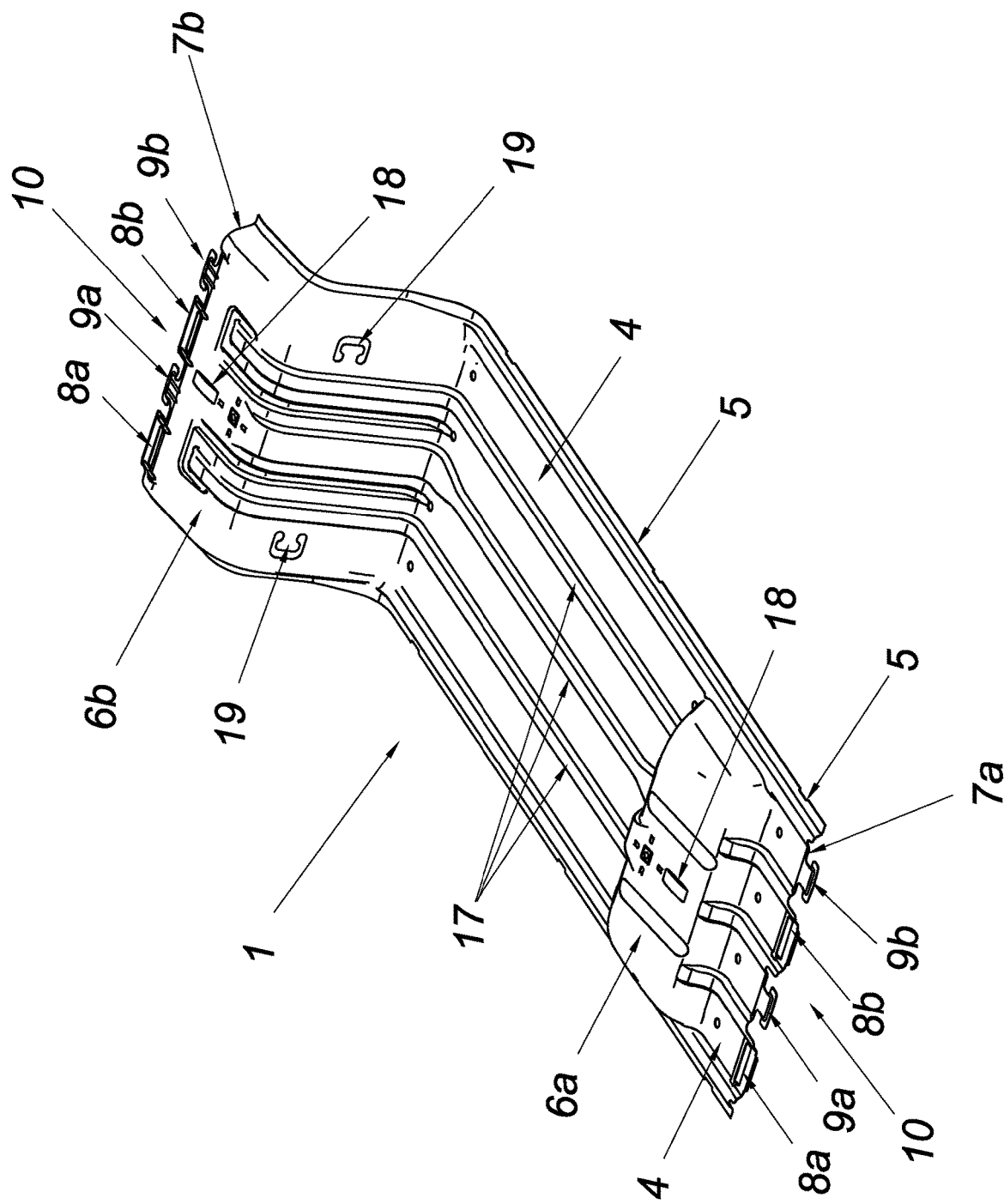
FIG. 1 shows a three-dimensional view of a holding element according to a first exemplary embodiment.

For example, FIG. 1 depicts an elongated holding element 1, which is manufactured out of an elongated piece of sheet metal or sheet metal strip by means of sheet metal forming, more particularly by means of deep drawing. Production can therefore be performed in a relatively inexpensive way. The holding element 1 is used for mounting at least one solar element 2, for example a PV module, PVT module, solar collector, etc., for example to a building 3, which is schematically depicted in FIG. 3.

For this purpose, the holding element 1 has an elongated base 4, which forms a flat support surface 5 for the holding element 1 against the building 3. The holding element 1 also has two supports 6a, 6b for the solar element 2, which supports 6a, 6b protrude up from the base 4 on the same base side—specifically at different heights h1, h2 relative to the base side, which, based on the preferably shared inclination of the more particularly flat support surfaces of the supports 6a, 6b, determines the inclination angle of the solar element 2 relative to the support surface 5. One or two solar elements 2 next to each other can rest on these supports 6a, 6b, as shown, for example, in FIG. 2.

In order to mechanically connect the holding element 1 for example to another holding element 1, as shown in FIG. 3, the ends 7a, 7b of the holding elements 1 have a plurality of openings 8a, 8b in the form of oblong holes and a plurality of tabs 9a, 9b and these connecting elements 10 are shaped to cooperate in a form-fitting way.

The openings 8a, 8b and tabs 9a, 9b integrally adjoin the sheet metal or more precisely stated, are formed out of this sheet metal, as can be seen in FIG. 1.

According to the invention, each end 7a, 7b is provided with two openings 8a, 8b and two tabs 9a, 9b next to each other, specifically next to each other in alternation, as can be seen, for example, in FIG. 1. Thus on each end 7a and 7b, there are two different mechanically couplable connecting elements 10, which can embody a mutually play-compensating, geometrically accurate, and secure connectabiity on the holding element 1. The holding element 1 is therefore suitable for securely holding solar elements 2—and can also do so when interconnected with other identically embodied holding elements 1.

This is even more true since the sheet metal is a metallically coated, namely hot-dip coated, sheet steel. The sheet steel is of the DX54D type with a steel alloy containing the following, each expressed in wt %

0.0033 carbon (C),
0.01 silicon (Si),
0.11 manganese (Mn),
0.04 aluminum (Al),
0.002 niobium (Nb),
0.045 titanium (Ti),
0.0048 nitrogen (N),
0.008 phosphorus (P),
0.01 sulfur(S),
and the remainder comprised of iron (Fe) and inevitable production-related impurities.

This sheet steel has a ferritic structure with a ferrite content of 99% in the ferritic structure, with the remainder being composed of titanium precipitates, which gives the holding element a high degree of ruggedness. This is also because the metallic coating is zinc-based, namely a ZM310 coating with a layer application of 300 g/m² in accordance with EN 10346.

Figure 2:
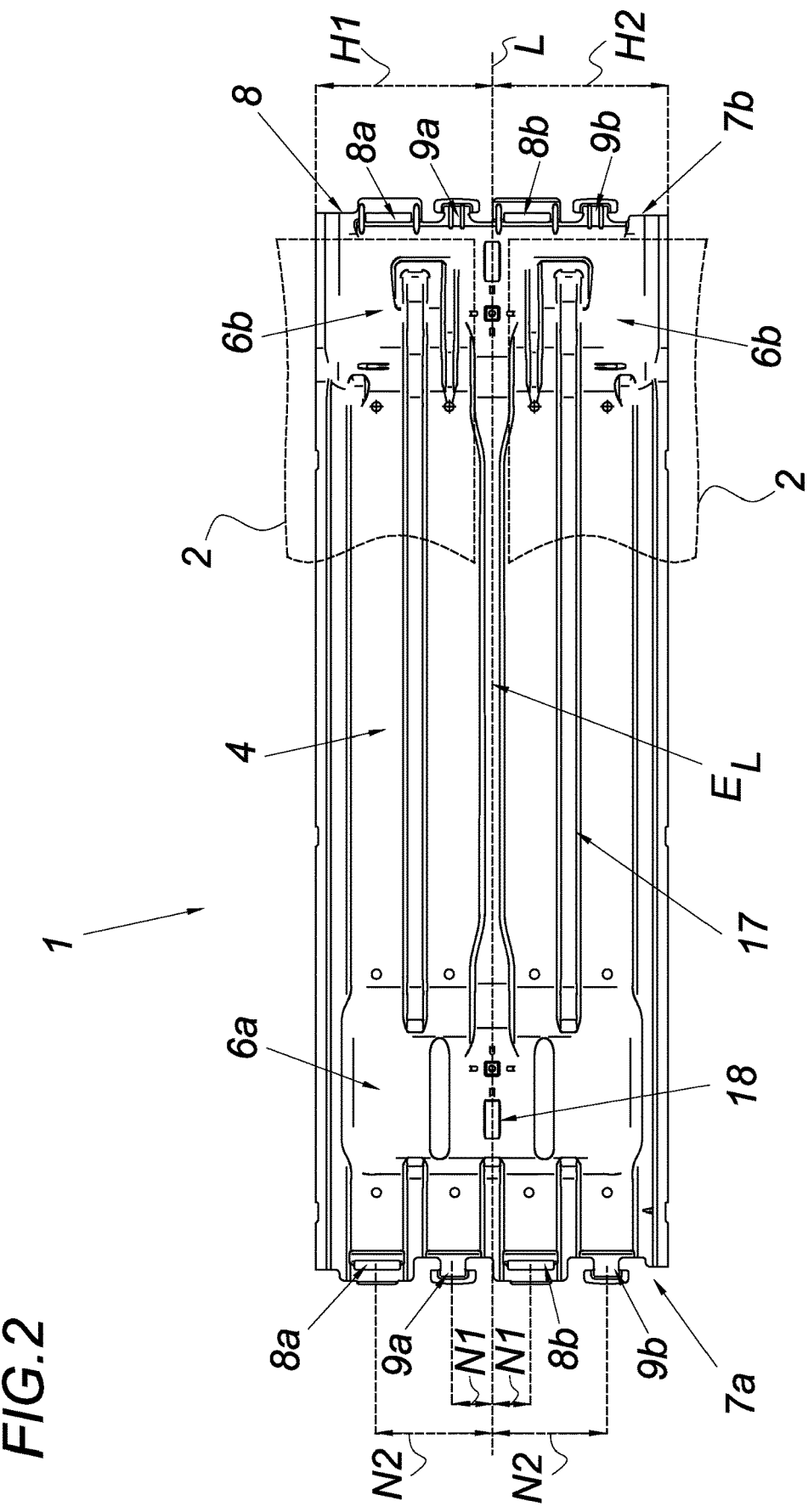
FIG. 2 shows a top view of the holding element according to FIG. 1.

As shown in FIG. 2, for example, each end 7a, 7b is provided with two openings 8a, 8b and two tabs 9a, 9b—specifically with one opening 8a or 8b and one tab 9a or 9b on each half side H1 or H2 of an end 7a or 7b—wherein a longitudinal centerline L of the holding element 1 divides the two ends 7a, 7b into their respective half sides H1 and H2.

In addition, for each opening 8a or 8b, a tab 9a or 9b is positioned at the same normal distance N1 or N2 from the vertical longitudinal center plane $E_L$ of the holding element 1, as is shown on the end 7a in FIG. 2, which serves as a representative of both ends 7a and 7b. It is thus possible to connect two holding elements 1 according to the invention, which are oriented in the same direction as each other, to each other by means of their matching ends 7a and 7b.

Figure 4:
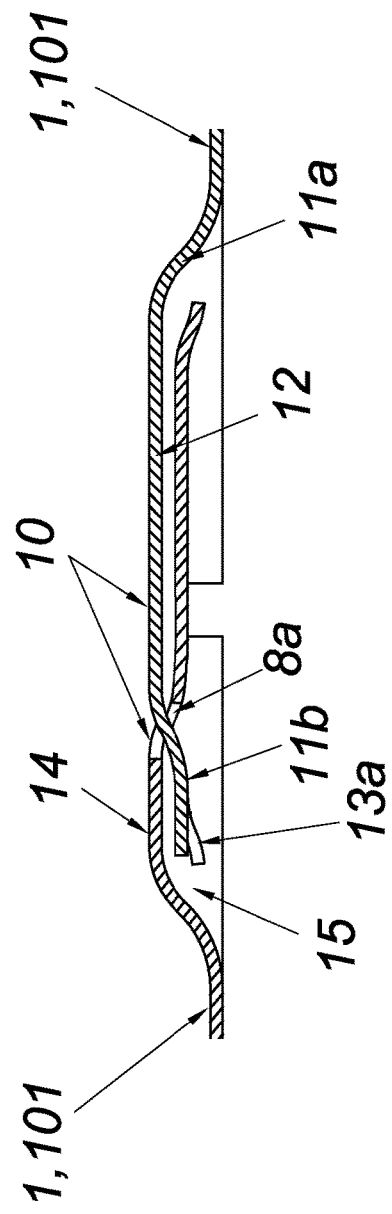
FIG. 4 shows a cut-away detail view of the connection between two holding elements in FIG. 3, FIGS. 4a and 4b show detail views of the complementary connecting elements that are connected in FIG. 4.
Figure 4B:
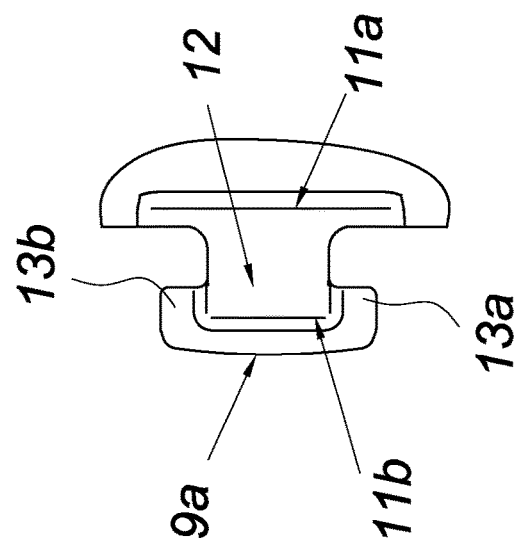
Figure 4A:
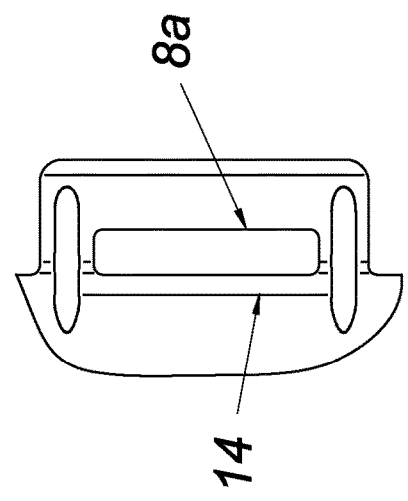

FIG. 4 is a more detailed depiction of the embodiment of an opening 8a and tab 9a in the situation in which they cooperate to produce an at least form-fitting connection of two holding elements 1.

Each tab 9a, 9b in the direction of the tab bridge-piece 12 has an upward-bent tab beginning 11a and a tab end 11b that is bent in the opposite direction from the tab beginning 11a. Between the bent tab beginning 11a and the tab end 11b there is a tab bridge-piece 12 that is straight and preferably parallel to the support surface 5. At the tab end 11b, two laterally protruding lobes 13a, 13b are provided.

The opening 8a is provided in a raised area 14 and this raised area 14 protrudes at least in a region of the holding element 1 adjacent thereto. The raised area 14 thus constitutes a socket 15 that is accessible via the opening 8a for a tab end 12 so that the latter is able to hook into the socket 15. For this purpose, the opening 8a is embodied as slot-shaped and extending transversely to the longitudinal centerline L of the holding element 1, which facilitates installation of the holding elements 1.

The first and second supports 6a, 6b are each provided in the vicinity of an end 7a, 7b of the holding element 1, wherein the holding element 1 terminates at the second support 6b, which is taller than the first support 6a vertically—i.e. in its distance from the base 4. It is thus possible to produce a direct connection to another holding element 1 in a material-saving way, for example.

The holding element 1 has a high degree of ruggedness because viewed in the longitudinal direction of the holding element 1, the base 4 forms support surfaces 5 both in front of the first support 6a and between the first and second supports 6a, 6b. The support surface 5 is also embodied with a weight 16 to provide ballast for the holding element 1. Despite the presence of this weight 16, the holding element 1 remains dimensionally stable for which purpose, the base 4 has a plurality of protruding parallel longitudinal beads 17.

In addition, on the second support 6b, the holding element 1 has a positioning aid 18 for the solar element 2 and a cable-fixing element 19, which makes it much easier to mount the solar element 2.

For this purpose, the positioning aid 18, which is preferably provided centrally on the respective support 6a, 6b, is embodied as a stop that protrudes from this support 6a, 6b and is provided for one side of the solar element 2.

As shown in FIG. 3, a plurality of holding elements 1 are positioned in series and connected to one another by means of their connecting elements 10—for which purpose the same ends 7b of the two holding elements 1 (i.e. of the first holding element 1 and the second holding element 1) are oriented toward each other. An at least form-fitting interconnection can thus be produced by means of the connecting elements of the same ends 7b, 7b—i.e. for fastening solar elements 2 that are oriented in different directions. This is particularly suitable for an east-west orientation of the solar elements 2 and thus for forming a solar array 20.

An orientation of the solar elements 2 in the same direction is enabled by providing an adapter element 100 between the one end 7a of the first holding element 1 and the other end 7b of the second holding element 1—see FIG. 5 in this connection. For this purpose, the adapter element 100 has complementary connecting elements 110 in order to connect the holding elements 1 at their different ends 7a, 7b. If a south-facing orientation of the solar elements 2 is desired, then this system is preferably selected for forming a solar array 21.

Figure 6:
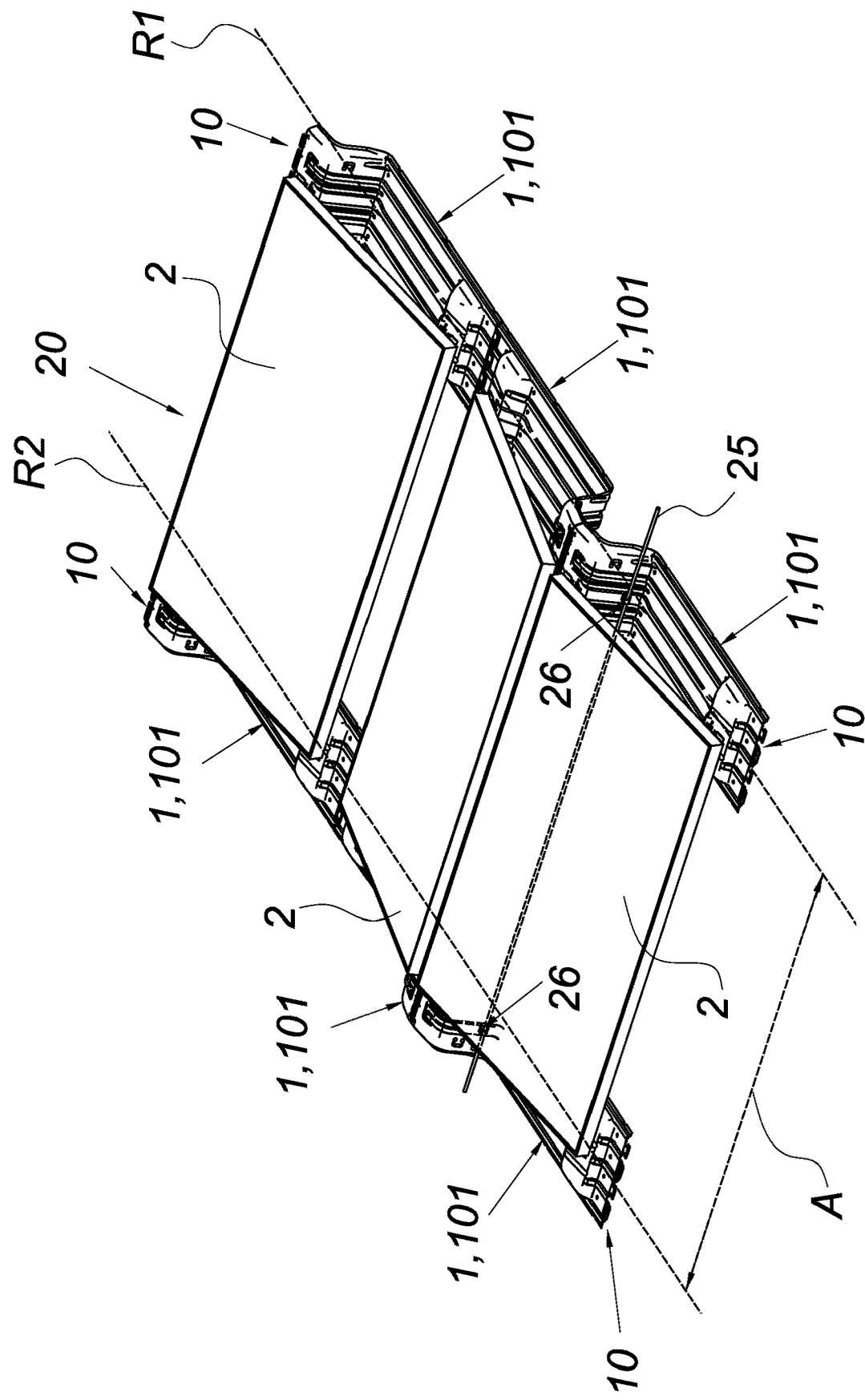
FIG. 6 shows a three-dimensional view of a solar array with a plurality of holding elements and solar elements.

In both of the solar arrays 20, 21, each solar element 2 rests on the supports 6a, 6b of two holding elements 1 provided directly next to each other and extending parallel, for example in order to form the solar array 20 shown in FIG. 6. The respectively connected holding elements 1 are thus positioned in rows R1, R2 with a distance A between these rows R1, R2. These rows R1, R2 have sufficiently large free areas on the respective supports 6a, 6b to be able to support other solar elements 2 that are not shown. The solar array 20, 21 can therefore be expanded in both the longitudinal direction and the lateral direction.

Figure 7:
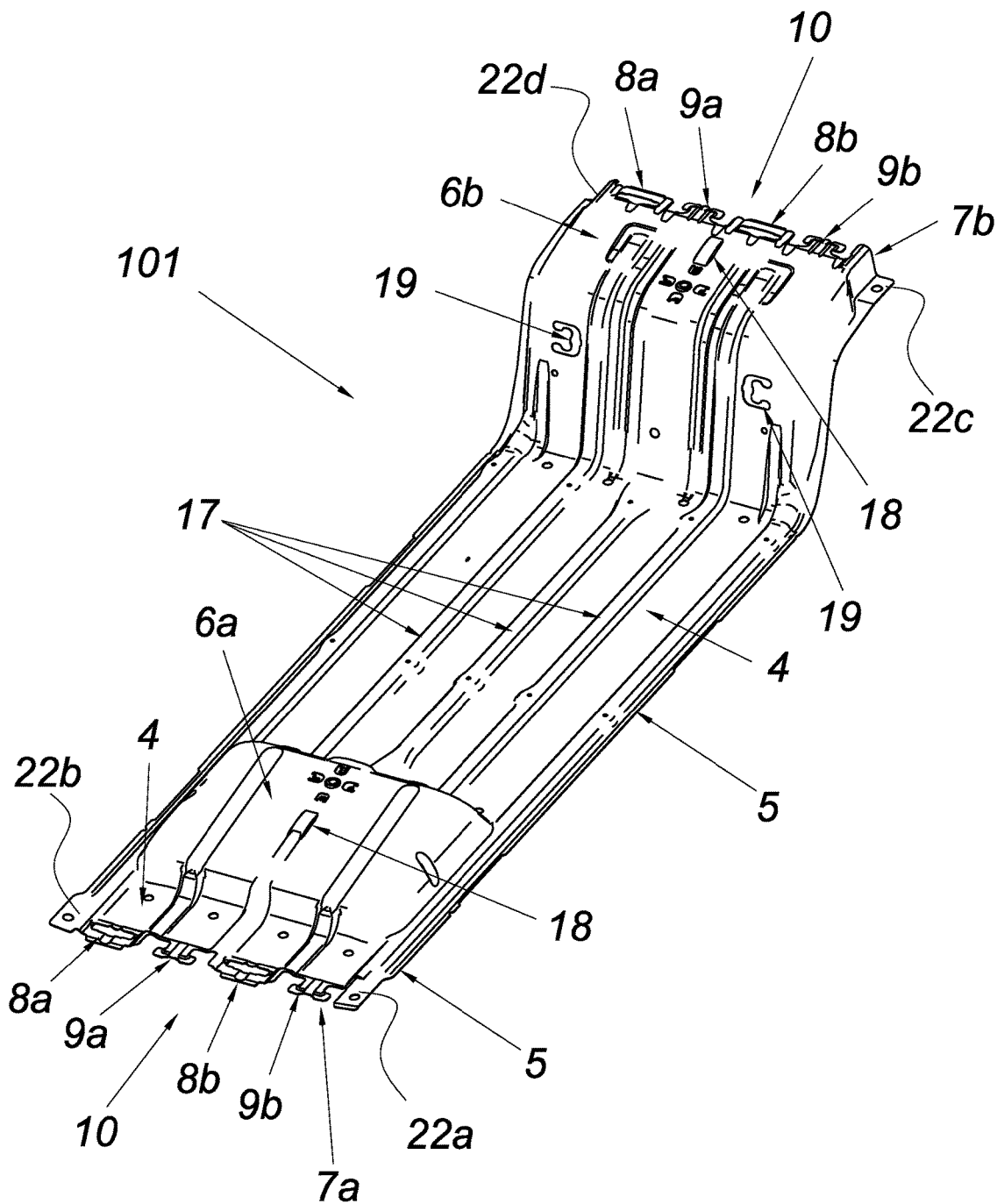
FIG. 7 shows a three-dimensional view of a holding element according to a second exemplary embodiment.
Figure 7A:
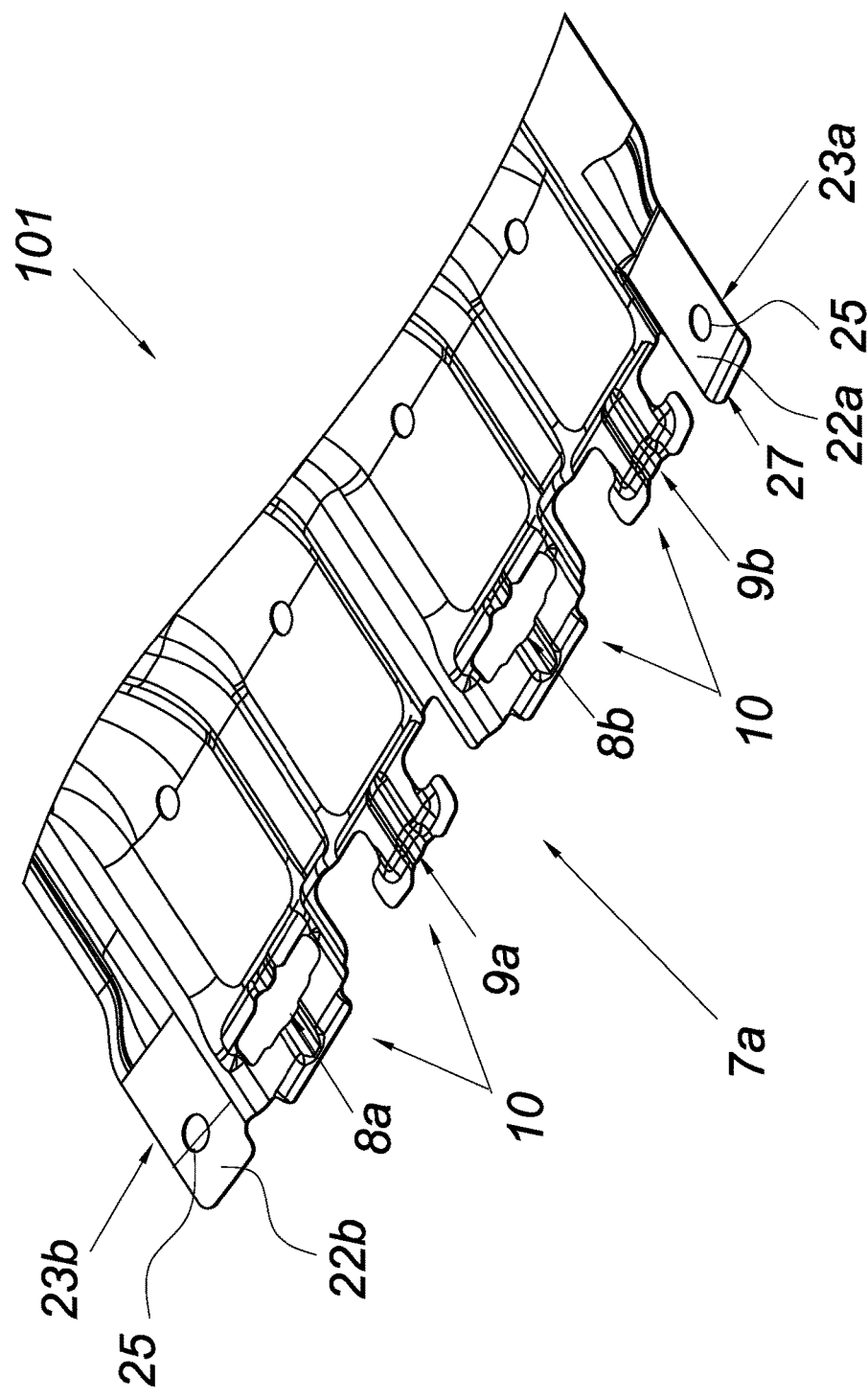
FIG. 7a shows a detail view of contact tongues on one end of the holding element in FIG. 7, and FIGS. 8a and 8b show three-dimensional views of electrical connections between two holding elements according to FIG. 7 that are mechanically connected to each other.

FIG. 7 shows a holding element 101 according to a second exemplary embodiment. This holding element 101 differs from the holding element 1 according to FIG. 1 due to the presence of additional contact tongues 22a, 22b, 22c, 22d to enable integration into the lightning protection of a building. This can also be used to produce a grounding equalization and/or potential equalization. These contact tongues 22a, 22b, 22c, 22d are shown enlarged in FIG. 7a and are positioned on both ends 7a, 7b of the holding element 101, specifically at the outer edges 23a, 23b of the end 7a, 7b. The positioning at the left and right extremities of the ends 7a, 7b provides comparatively easy access and a rugged option for a grounding equalization and/or potential equalization of the holding element 101.

The contact tongues 22a, 22b, 22c, 22d have a cross-sectional area of at least 21 mm$^2$. The cross-sectional area is calculated from the respective width of the contact tongue 22a, 22b, 22c, 22d of 30 mm multiplied by the related sheet thickness of 0.7 mm each. This cross-sectional area is thus comparatively large in order to enable a low electrical resistance to the dissipation of a large amount of electrical energy. The holding element 101 can therefore satisfy all of the requirements for integration into the lightning protection in accordance with DIN EN 62561-1. Preferably, there is a cross-sectional area of greater than or equal to 12.5 mm$^2$, more particularly greater than or equal to 20 mm$^2$, over the entire length of the contact tongues 22a, 22b, 22c, 22d.

Figure 8A:
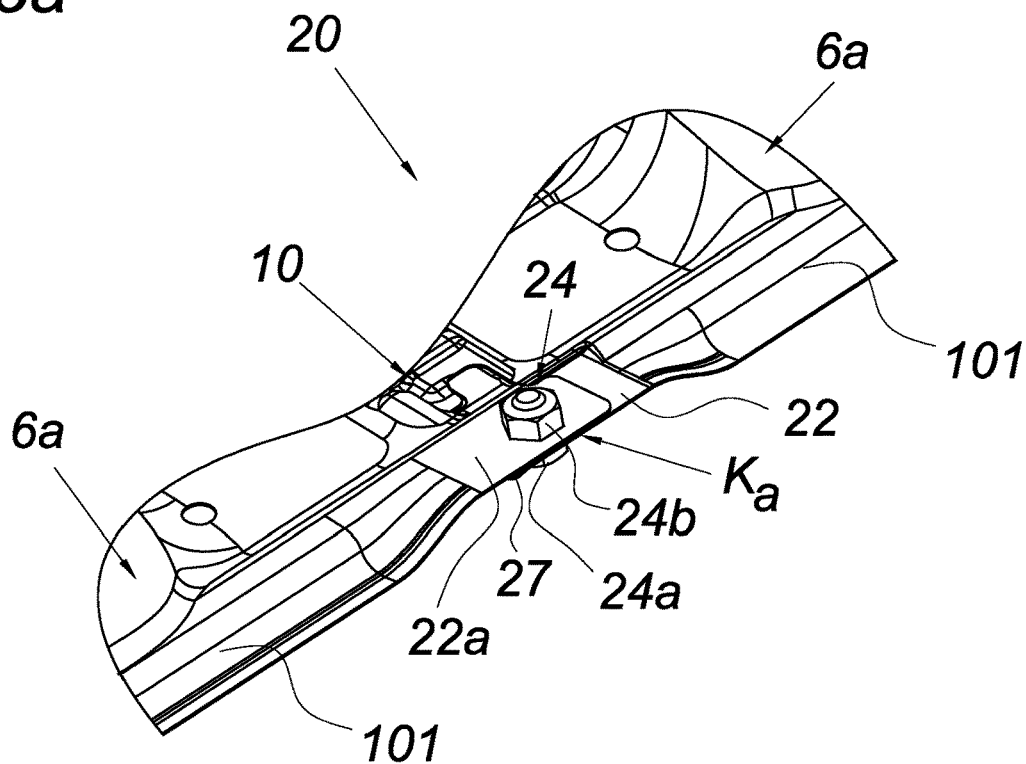
Figure 8A:
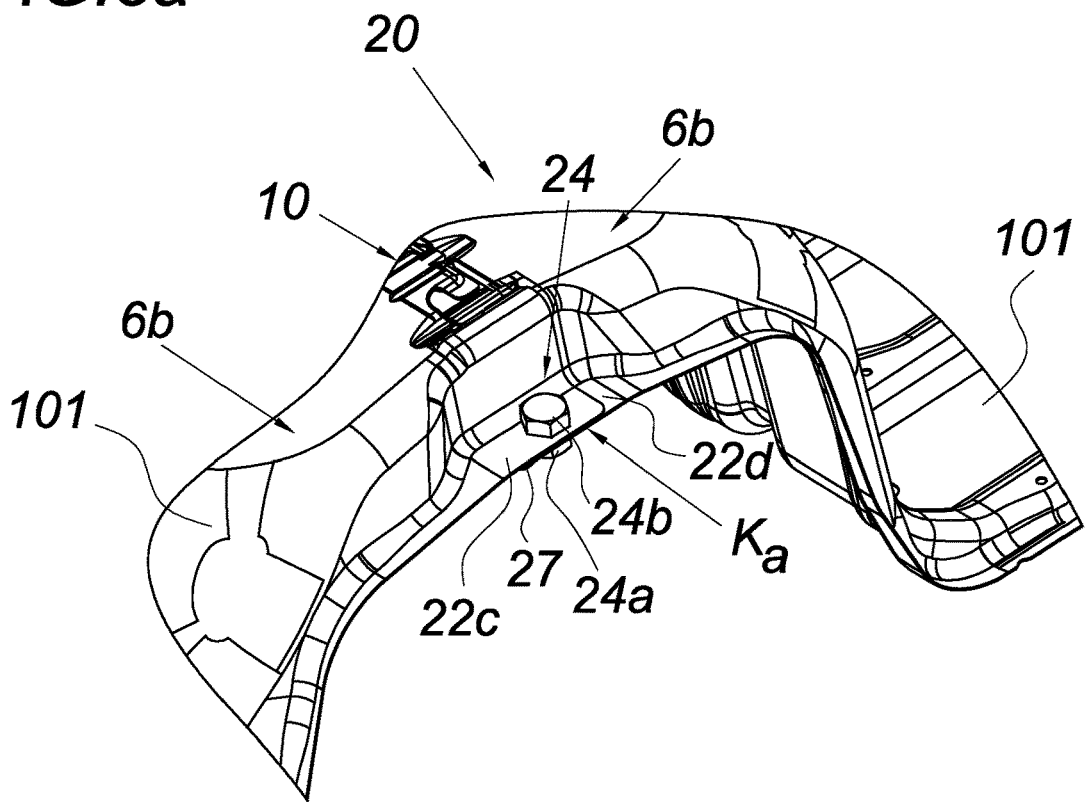

The contact tongues 22a, 22b, 22c, 22d, which essentially extend in a plane, protrude beyond the tabs 9a, 9b on the relevant end 7a, 7b, which facilitates contacting of them in a wide variety of systems 20, 21 that differ from the system 20 shown in FIGS. 8a and 8b.

The contact tongues 22a, 22b, 22c, 22d—as demonstrated—are rectangular when viewed from above. On both ends 7a and 7b, one of the two contact tongues 22a and 22d is provided with a chamfer 27 at its free end in order to facilitate the positioning of the holding element 101.

According to FIGS. 8a and 8b, the holding elements 101 that are connected to each other overlap with their contact tongues 22a, 22b, which forms a sufficient contact surface between these three depicted holding elements 101. Thus according to FIG. 8a, a first and second holding element 101 are mechanically connected to each other at their first ends 7a by means of the connecting elements 10 and are connected to each other electrically and with the ability to conduct lightning current by means of the contact tongues 22a, 22b. According to FIG. 8b, the second and a third holding element 101 are mechanically connected to each other at their second ends 7b by means of the connecting elements 10 and are electrically connected by means of the contact tongues 22c, 22d.

The respective overlapping of the contact tongues 22a, 22b produces a contact surface Ka between them, which ensures a particularly low electrical resistance between the respective holding elements 101. It is therefore not necessary to expect a shift in potential, which also achieves a connection that is able to conduct lightning current in accordance with DIN EN 62561-1. In this connection, it is also advantageous that the sheet metal of the holding elements 101 is a metallically coated sheet steel.

The contact surfaces Ka are secured by means of a screw connection 24, namely with a screw 24a and a nut 24b. The screw connection 24 in this case extends through the holes 25 of the respective contact tongues 22a, 22b, 22c, 22d. This ensures a comparatively good current dissipation in the event of a lightning strike—even without the use of contact terminals that are known from the prior art. Instead of the screw connection 24, it is conceivable for a terminal clamp to be slid onto the two contact tongues 22a, 22b, 22c, 22d. It is conceivable for an opening with dimensions that have been adapted in this regard to be provided in order to secure this terminal clamp to the holding elements.

In addition, the rows R1, R2 on holding elements 1, 101, as shown in FIG. 6 for the holding elements 1, for example, are short-circuited via a rigid electrical conductor 25. It is also conceivable, however, for a flexible conductor to be provided, which is not shown. The electrical conductor 25 is electrically connected to each holding element 1 by means of a respective screw-clamp connection 26. The two holding elements are thus connected to each other electrically and it is possible to provide a connection that is able to conduct lightning current in accordance with DIN EN 62561-1.

It should be generally noted that the German expression "insbesondere" can be translated as "more particularly" in English. A feature that is preceded by "more particularly" is to be considered an optional feature, which can be omitted and does not thereby constitute a limitation, for example, of the claims. The same is true for the German expression "vorzugsweise", which is translated as "preferably" in English.

The invention claimed is:

1. A holding element made of a sheet metal for at least one solar element, comprising:
    a base that forms at least one support surface for the holding element,
    first and second supports for the solar element that protrude up from the base at different heights, and
    a plurality of connecting elements, which are provided on ends of the holding element and have at least one hole-shaped opening and at least one tab, which is shaped for being inserted into the at least one opening, wherein at least one of the at least one opening and at least one of the at least one tab are respectively provided next to each other on each of the ends,
    wherein on at least one outer edge of at least one of the ends of the holding element, the holding element has at least one contact tongue for a lightning protection and/or grounding equalization and/or potential equalization, and the at least one contact tongue protrudes beyond the tab on a respective end, and
    wherein the sheet metal is a metallically coated sheet steel.

2. The holding element according to claim 1, wherein the holding element has at least one contact tongue at both outer edges of each end.

3. The holding element according to claim 2, wherein the holding element has two contact tongues, and on one end of the holding element, one of the two contact tongues has a chamfer at its free end.

4. The holding element according to claim 1, wherein the at least one contact tongue extends essentially in a plane.

5. The holding element according to claim 1, wherein a cross-sectional area of the at least one contact tongue is greater than or equal to 12.5 mm$^2$.

6. The holding element according to claim 1, wherein the sheet steel has a steel alloy comprising the following, each expressed in wt %:
    0.02 to 0.25 manganese (Mn),
    0.01 to 0.10 aluminum (Al),
    0.003 to 0.10 silicon (Si),
    0.0010 to 0.0060 carbon (C),
members of the following group individually or in combination:
    0.01 to 0.20 niobium (Nb)
    0.01 to 0.20 titanium (Ti),
optionally members of the following group individually or in combination:
    <0.2 molybdenum (Mo)
    <0.20 copper (Cu)
    <0.05 nitrogen (N)
    <0.02 phosphorus (P)
    <0.03 sulfur(S),
and a remainder comprised of iron (Fe) and inevitable production-related impurities.

7. The holding element according to claim 1, wherein the sheet steel is type DX54D according to VDA 239-100.

8. The holding element according to claim 1, wherein the sheet steel has a ferritic structure.

9. The holding element according to claim 8, wherein a ferritic content in the structure is >95% and the remainder is composed of precipitates.

10. The holding element according to claim 1, wherein the metallically coated sheet steel comprises a metallic coating that is zinc-based or aluminum-based.

11. The holding element according to claim 10, wherein the zinc-based metallic coating also contains 1 to 5 wt % of aluminum and/or magnesium.

12. The holding element according to claim 10, wherein the metallic coating has a layer application of at least 100 g/m$^2$.

13. The holding element according to claim 1, wherein the ends of the holding element each have a first half-side and a second half-side, with at least one opening positioned in the first half-side and at least one tab positioned on the second half-side.

14. The holding element according to claim 13, wherein at each of the ends, for each opening of the first and second half-side, a tab of the other of the first and second half-side is positioned at the same normal distance from a longitudinal centerline of the holding element.

15. The holding element according to claim 1, wherein in a direction of a tab bridge-piece, the tab has a bent tab beginning and a tab end that is bent in an opposite direction from the tab beginning, and the opening is provided in a raised area in the holding element, which raised area constitutes a socket that is accessible via the opening for the tab end so that the tab end is able to hook into the socket.

16. The holding element according to claim 15, wherein the tab end has at least one laterally protruding lobe.

17. The holding element according to claim 1, wherein the at least one opening is slot-shaped, extending transversely to a longitudinal centerline of the holding element.

18. The holding element according to claim 1, wherein the at least one opening and the at least one tab are provided next to each other in alternation on at least one of the ends of the holding element.

19. The holding element according to claim 1, wherein the first and second supports are each provided in a vicinity of at least one of the ends of the holding element.

20. The holding element according to claim 1, wherein the holding element terminates at the second support and the second support is taller than the first support vertically.

21. The holding element according to claim 1, wherein in a longitudinal direction of the holding element, the base forms support surfaces both in front of the first support and between the first and second supports.

22. The holding element according to claim 1, wherein between the first and second supports, the base is embodied to provide ballast for the holding element.

23. The holding element according to claim 1, wherein the base has a plurality of longitudinal, protruding beads.

24. The holding element according to claim 1, wherein the first and/or second support has a positioning aid for the solar element and/or a cable-fixing element.

25. A system comprising a plurality of the holding elements according to claim 1, wherein at least two of the holding elements are connected to each other by the plurality of connecting elements of the same ends.

26. The system according to claim 25, wherein the holding elements each have at least one contact tongue on at least one outer edge of at least one of the ends of the holding element, and the holding elements overlap with their contact tongues and form a contact surface situated between the holding elements.

27. A system composed of a plurality of the holding elements according to claim 1, wherein at least two of the holding elements are connected to each other by an adapter element, wherein on its ends, the adapter element has connecting elements, which are embodied to be complementary to the ends of the at least two holding elements.

28. The system according to claim 27, wherein the holding elements each have at least one contact tongue on at least one outer edge of at least one of the ends of the holding element, and the holding elements each overlap a tongue of the adapter element and form a contact surface situated between the holding elements.

29. A system comprising:
   at least two of the holding elements according to claim 1, and
   at least one solar element that is a solar module and/or a solar collector, wherein the at least one solar element rests on the first and second supports of the at least two holding elements that are provided directly next to each other.

30. The system according to claim 29, wherein the at least two holding elements that are provided next to each other are electrically connected by a rigid electrical conductor.

31. A solar array comprising a system according to claim 29.

* * * * *